United States Patent
Evans et al.

(10) Patent No.: US 11,602,993 B1
(45) Date of Patent: Mar. 14, 2023

(54) SYSTEM AND METHOD FOR ADJUSTING THE TRANSPARENCY OF A DIGITAL NEEDLE

(71) Applicants: Toyota Motor Engineering & Manufacturing North America, Inc., Plano, TX (US); Toyota Jidosha Kabushiki Kaisha, Toyota (JP)

(72) Inventors: George M. Evans, Ann Arbor, MI (US); Aaron M. France, Westland, MI (US); Benjamin Piya Austin, Saline, MI (US); Craig D. Herring, Pinckney, MI (US); Philip J. Babian, Canton, MI (US); Ichiroh Isobe, Aichi (JP); William Patrick Garrett, Plymouth, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/680,935

(22) Filed: Feb. 25, 2022

Related U.S. Application Data (60) Provisional application No. 63/245,333, filed on Sep. 17, 2021.

(51) Int. Cl.
*B60K 35/00* (2006.01)

(52) U.S. Cl.
CPC ........ *B60K 35/00* (2013.01); *B60K 2370/167* (2019.05); *B60K 2370/28* (2019.05); *B60K 2370/52* (2019.05)

(58) Field of Classification Search
CPC .............. B60K 35/00; B60K 2370/167; B60K 2370/28; B60K 2370/52
See application file for complete search history.

(56) References Cited

U.S. PATENT DOCUMENTS

| | | |
|---|---|---|
| 10,144,287 B2 | 12/2018 | Shoji et al. |
| 10,810,703 B2 | 10/2020 | Maeda et al. |
| 10,926,638 B1 * | 2/2021 | Chang .................... B60K 35/00 |
| 2016/0311370 A1 * | 10/2016 | Oyanagi ................ B60K 37/02 |
| 2018/0215263 A1 * | 8/2018 | Shoji ...................... B60K 37/06 |
| 2018/0218691 A1 * | 8/2018 | Shoji ...................... B60K 35/00 |

* cited by examiner

*Primary Examiner* — Doon Y Chow
*Assistant Examiner* — Dennis Chow
(74) *Attorney, Agent, or Firm* — Christopher G. Darrow; Darrow Mustafa PC (57) ABSTRACT

A system and method for adjusting the transparency of a digital needle of a digital gauge are disclosed herein. The system and method adjust a transparency of a digital needle based on an operating state of an engine of a vehicle.

14 Claims, 7 Drawing Sheets

SYSTEM AND METHOD FOR ADJUSTING THE TRANSPARENCY OF A DIGITAL NEEDLE

CROSS-REFERENCE TO RELATED APPLICATION

This application claims priority to U.S. Provisional Patent Application No. 63/245,333 filed Sep. 17, 2021, which is hereby incorporated by reference in its entirety.

TECHNICAL FIELD

The subject matter described herein relates, in general, to systems and methods for adjusting the transparency of a digital needle and, more specifically, for adjusting the transparency of a digital needle of a digital gauge of a vehicle.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

Some vehicles have hybrid powertrains that include both a traditional internal combustion engine and one or more electric motors that provide propulsion to one or more vehicle wheels. In some cases, these vehicles are hybrid electric vehicles (HEVs) or plug-in hybrid electric vehicles (PHEVs). HEVs and PHEVs make use of efficiency-improving technologies such as regenerative brakes that convert the vehicle's kinetic energy to electric energy stored in a battery. PHEVs can also use electricity from a power grid to charge the battery.

When the battery is sufficiently charged, HEVs and PHEVs can operate in an electric vehicle (EV) mode, wherein the electric motors solely provide the propulsion for the vehicle. However, when the charge of the battery drops below a threshold and/or the driver demands additional power, the vehicle will switch on its internal combustion engine. Once the battery is sufficiently charged (either through regenerative braking and/or receiving power from the electrical grid) and/or the power demand from the driver drops, the vehicle may return to operating in an EV mode.

Transitions between operating in an EV mode and a more traditional mode where the internal combustion engine provides at least some of the propulsion for the vehicle, may cause the vehicle's tachometer to move erratically. This erratic movement is sometimes referred to as needle bounce or needle jump. Moreover, a tachometer provides an indication of the engine speed of the internal combustion engine. When the internal combustion engine is switched on or off, the engine speed may vary significantly, causing the tachometer needle to bounce. This bouncing of the tachometer needle can distract the driver and/or cause the driver to believe that something is wrong with their vehicle.

There are also other situations where needle bounce may occur. For example, some vehicles have a start-stop system that automatically shuts down and restarts the engine of the vehicle to reduce the amount of time the engine spends idling, which can reduce fuel consumption and emissions. However, the starting and stopping of the engine can cause the tachometer needle to bounce excessively.

SUMMARY

This section generally summarizes the disclosure and does not comprehensively explain its full scope or all its features.

In one example, a system includes a processor and a memory in communication with the processor having a needle fade module. The needle fade module includes instructions that, when executed by the processor, cause the processor to adjust a transparency of a digital needle of a digital gauge cluster based on an operating state of an engine of a vehicle. For example, when the operating state of the engine is in a shutdown state, the transparency of the digital needle may be increased. Conversely, when the operating state of the engine is in a start state, the transparency of the digital needle may be decreased. By adjusting the transparency of the needle when the engine is in a shutdown and/or start state, needle bounce caused when the engine is in these states becomes less distracting to the operator of the vehicle.

In another example, a method includes the steps of adjusting a transparency of a digital needle of a digital gauge cluster based on an operating state of an engine of a vehicle. Like before, when the operating state of the engine is in a shutdown state, the transparency of the digital needle may be increased. Conversely, when the operating state of the engine is in a start state, the transparency of the digital needle may be decreased.

In yet another example, a non-transitory computer-readable medium includes instructions that, when executed by a processor, cause the processor to adjust a transparency of a digital needle of a digital gauge cluster based on an operating state of an engine of a vehicle. Again, when the operating state of the engine is in a shutdown state, the transparency of the digital needle may be increased. Conversely, when the operating state of the engine is in a start state, the transparency of the digital needle may be decreased.

Further areas of applicability and various methods of enhancing the disclosed technology will become apparent from the description provided. The description and specific examples in this summary are intended for illustration only and do not limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

A system and method for adjusting the transparency of a digital needle of a digital gauge are disclosed herein. As explained in the background section, some vehicles, such as HEVs and PHEVs, experience significant needle bounce of the tachometer needle when the internal combustion engine of these vehicles are in a shutdown and/or start state. Moreover, when the internal combustion engine is starting or shutting down, the engine speed of the internal combustion engine can vary significantly, causing the tachometer needle to bounce excessively. This needle bounce may also be experienced by drivers of vehicles that are equipped with a start-stop system that automatically shuts down and restarts the engine to reduce the amount of time the engine spends idling. The shutting down and restarting of the engine may result in significant needle bounce of the tachometer needle.

Here, the system and method adjust the digital needle's transparency based on the operating state of the engine of the vehicle. For example, when the internal combustion engine is off or is in a running state, the transparency of the needle may be decreased so that the driver can easily see the digital needle and understand the engine speed of the internal combustion engine. When the internal combustion engine is transitioning between an off and a running state (sometimes referred to as a start state), the transparency of the digital needle may be varied so as not to create a distraction to the driver. Similarly, when the internal combustion engine is transitioning between a running state and an off state (sometimes referred to as a shutdown state), the transparency of the digital needle may also be increased to prevent distractions.

Figure 1:
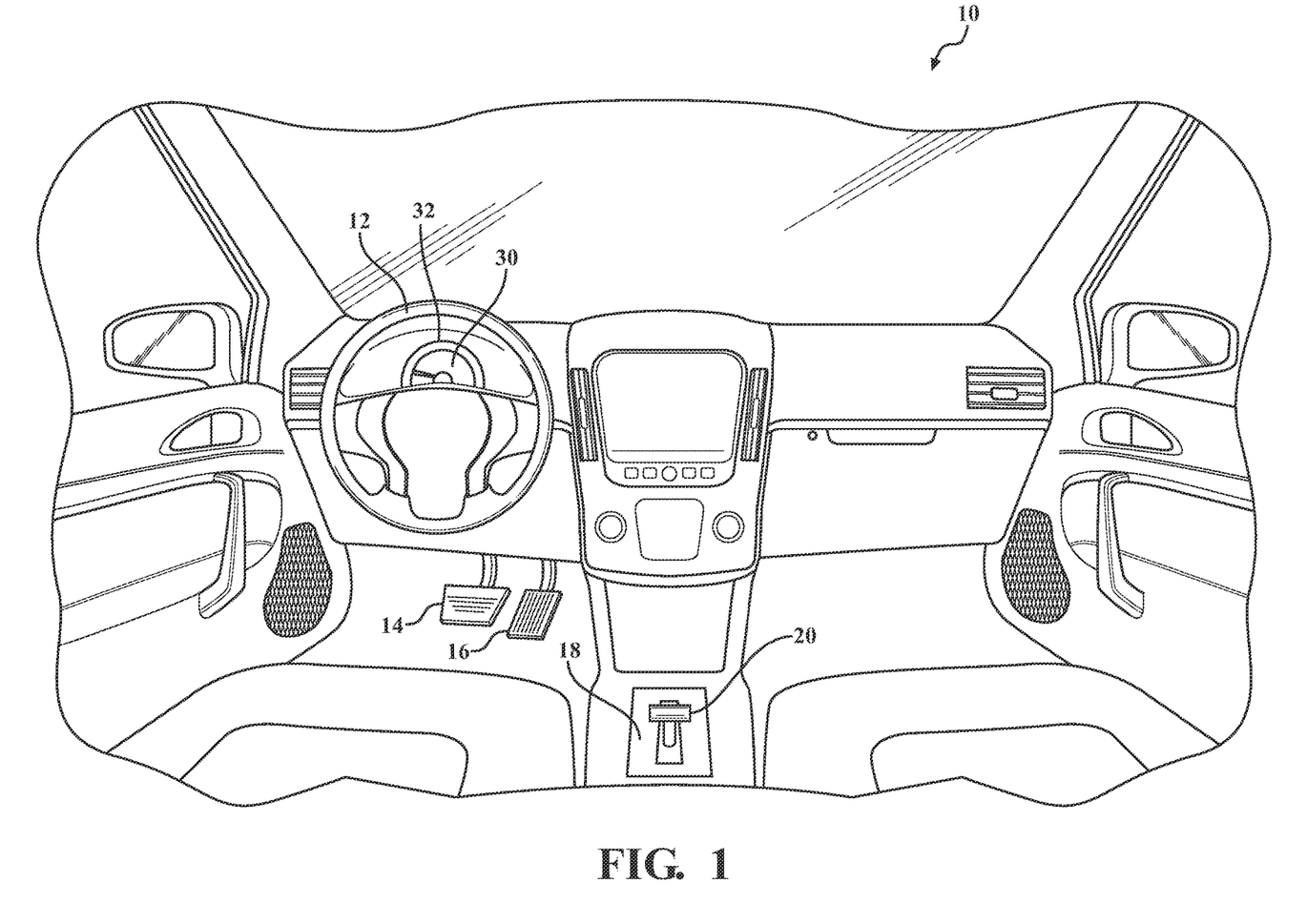
FIG. 1 illustrates one example of a cockpit of a vehicle having a digital needle adjustment system for adjusting the transparency of a digital needle.

Referring to FIG. 1, illustrated is one example of a cockpit 10 of a vehicle. Here, the cockpit 10 includes driver inputs, such as a steering wheel 12 for controlling the steering of the vehicle, a brake pedal 14 for applying the brakes of the vehicle, a throttle pedal 16 that controls the propulsion of the vehicle, and a gear selector 18 having a gear stick 20 for selecting one or more gears of the vehicle. The gear selector 18 can take any one of a number of different forms and does not necessarily need to include the gear stick 20 for selecting different gears of the vehicle. As it is generally understood, the gear selector 18 allows the driver of the vehicle to select different transmission states, such as drive, reverse, neutral, park, and/or other selections.

The cockpit 10 may also include systems that can output information to the driver. While the cockpit 10 may include numerous systems to output different types of information to the driver, special focus is placed on a display device 30 having a display 32. In this example, the display device 30 can display one or more digital gauges in the display 32 and may form at least part of an instrument cluster. Unlike analog gauges, which include physical elements, such as a physical background with indicia and a physical needle, digital gauges are displayed by the display device 30. The display 32 of the display device can be any type of device capable of displaying images to the driver, such as a flat-panel display, and can use any one of several different technologies such as LED, OLED, microLED, and the like. However, in other examples, the display 32 may be a heads-up-display (HUD).

Figure 2:
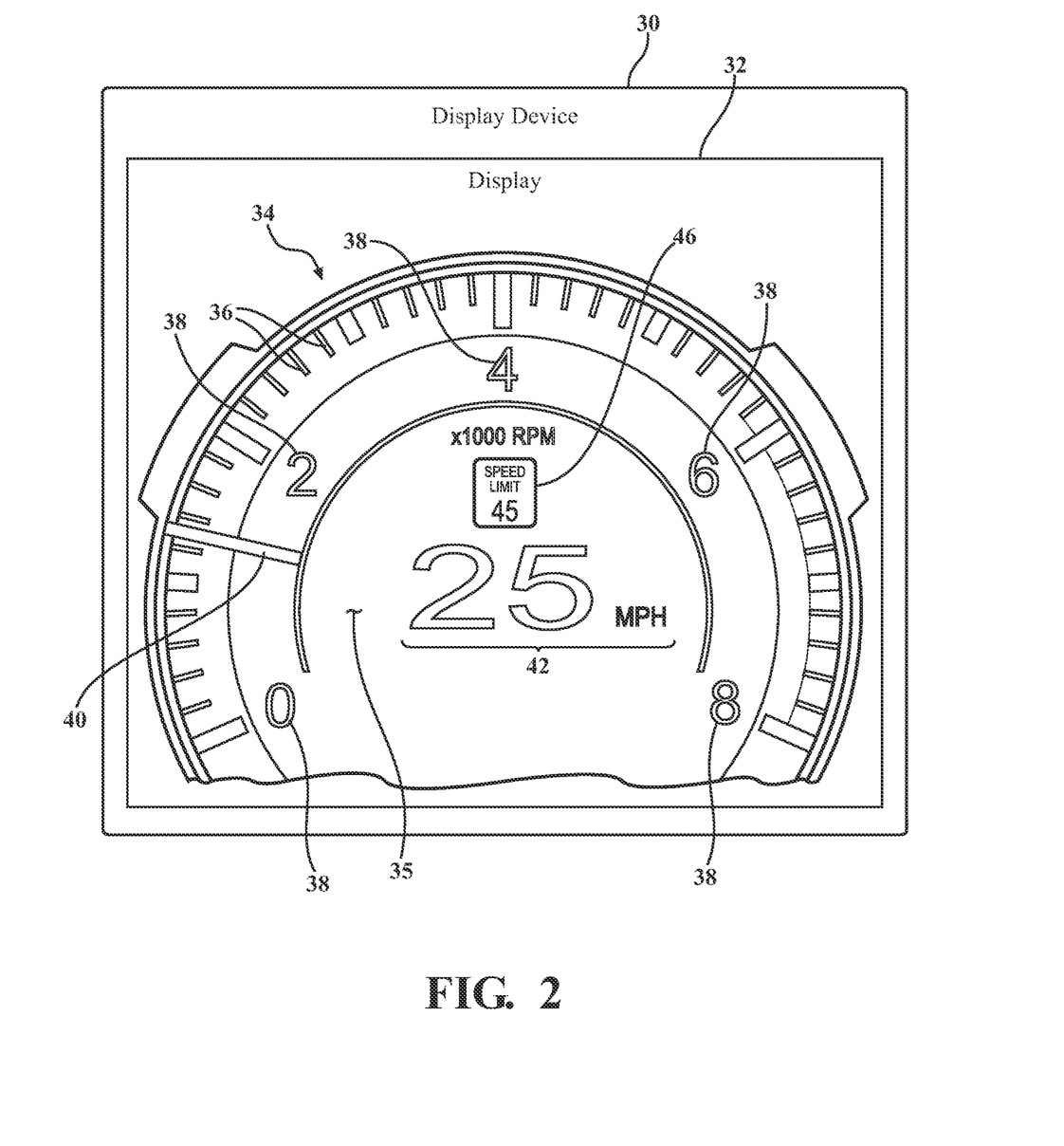
FIG. 2 illustrates one example of a display device having a display for displaying a digital gauge having a digital needle.

FIG. 2 illustrates a more detailed view of one example of a digital gauge 34 that may be displayed on the display 32 of the display device 30. In this example, the digital gauge 34 may be functioning as a tachometer that provides information regarding the engine speed of an engine of a vehicle. However, it should be understood that the digital gauge 34 may be providing other types of information and not just engine speed information. Here, the digital gauge 34 includes indicia, such as hash lines 36 and numbers 38, representing different vehicle engine speeds, and a background 35. As explained previously, the indicia, including the hash lines 36, the numbers 38, and the background 35, are elements displayed on the display 32 of the display device 30 and are not physical elements.

The digital gauge 34 may also display other elements unrelated to the primary information displayed by the digital gauge 34. In this example, the digital gauge 34 displays engine speed information but also displays other unrelated elements such as the current speed of the vehicle 42 and the posted speed limit 46 of the particular road segment that the vehicle is traveling on. It should be understood that the digital gauge 34 may vary from application to application and other elements displayed by the digital gauge 34, as well as the layout of the hash lines 36 and numbers 38 may vary in size, shape, color, and the like.

A digital needle 40 is displayed within the digital gauge 34 and, based on its position relative to the hash lines 36 and numbers 38, it can indicate the engine speed to a driver. In this example, the digital needle 40 indicates that the engine is operating at approximately 1350 RPM. Again, the digital needle 40 is a display element and is not a physical needle. As will be explained later in this application, the vehicle includes a digital needle adjustment system that can adjust the transparency of the digital needle 40. Like the hash lines 36 and the numbers 38, the digital needle 40 can vary in size, shape, color, and the like.

Figure 3:
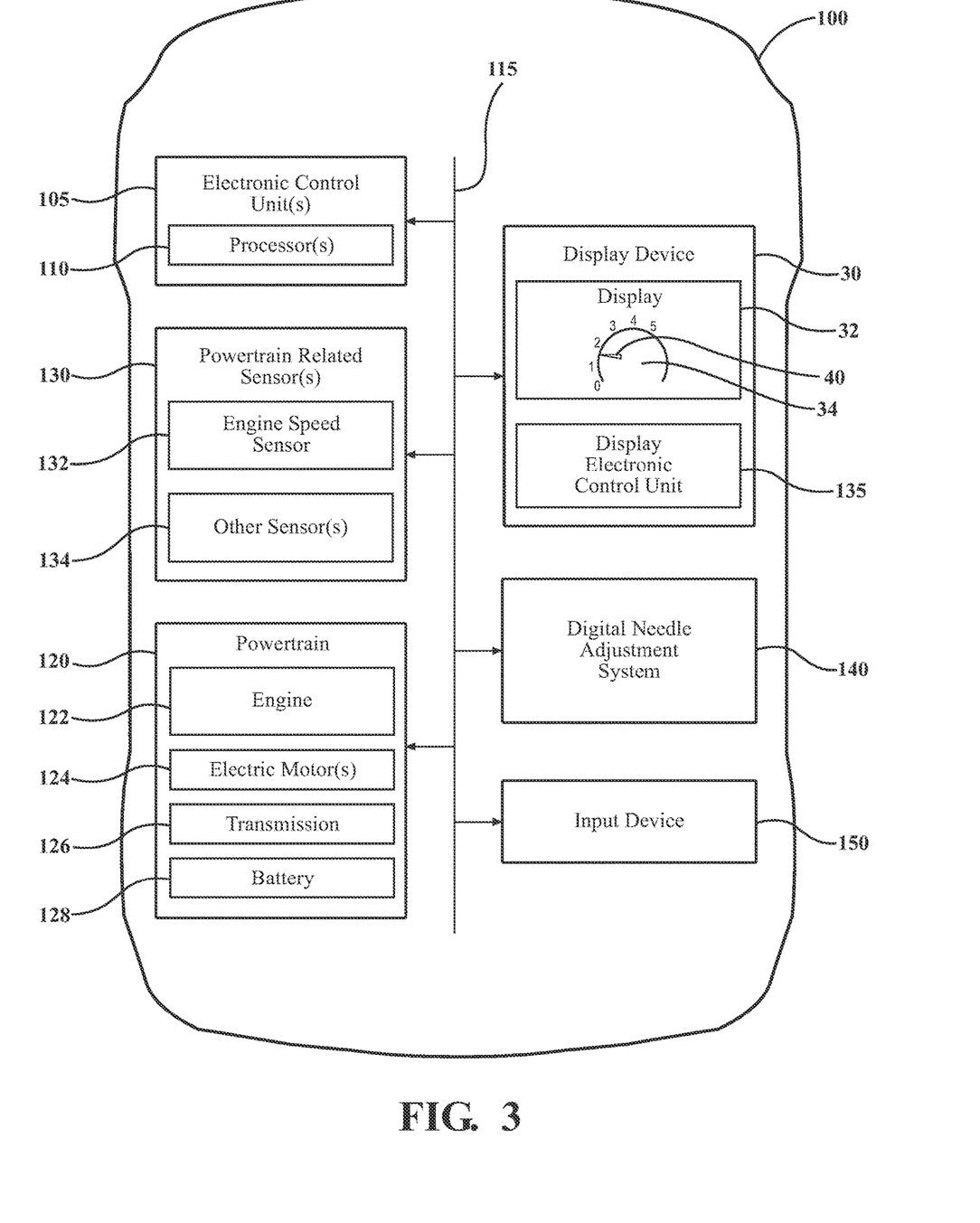
FIG. 3 illustrates one example of a vehicle incorporating the digital needle adjustment system.

Illustrated in FIG. 3 is one example of a vehicle 100 having a digital needle adjustment system 140 that can adjust the transparency of the digital needle 40. As explained previously, the vehicle 100 includes the display device 30 that can display the digital gauge 34 having the digital needle 40. As used herein, a "vehicle" is any form of powered transport. In one or more implementations, the vehicle 100 is an automobile and may be an HEV or PHEV. However, the vehicle can be a traditional vehicle as well. Again, the digital needle adjustment system 140 can have a variety of different applications that are not just limited to traditional vehicles, HEVs, PHEVs, and the like. Further still, the information provided by the digital gauge 34 in the digital needle 40 can vary from application to application and is not necessarily limited to tachometer-based applications.

The vehicle 100 also includes various elements. It will be understood that in various embodiments, it may not be necessary for the vehicle 100 to have all of the elements shown in FIG. 3. The vehicle 100 can have any combination of the various elements shown in FIG. 3. Further, the vehicle 100 can have additional elements to those shown in FIG. 3. In some arrangements, the vehicle 100 may be implemented without one or more of the elements shown in FIG. 3. While the various elements are shown as being located within the vehicle 100 in FIG. 3, it will be understood that one or more of these elements can be located external to the vehicle 100.

Further, the elements shown may be physically separated by large distances and provided as remote services (e.g., cloud-computing services).

In this example, the vehicle 100 includes one or more electronic control units (ECUs) 105, each having one or more processor(s) 110. The ECUs 105 may be one or more ECUs that control the operation of one or more systems and subsystems of the vehicle 100. For example, the ECUs 105 may include ECUs directed to managing the powertrain 120 of the vehicle 100, such as fuel injection ECUs, hybrid motor control ECUs, transmission control ECUs, and the like.

The vehicle 100 can also include one or more powertrain sensor(s) 130. The powertrain sensor(s) 130 can include any one of a number of different sensors. In this example, the powertrain sensor(s) 130 include an engine speed sensor 132 but may also include other sensors 134. The engine speed sensor 132 can measure and output signals representative of the engine speed of the engine 122 of the vehicle 100. The other sensors 134 can be any type of powertrain or propulsion related sensors, such as air mass meters, air flow meters, camshaft position sensors, crankshaft speed sensors, knock sensors, temperature sensors, wheel speed sensors, gear selection sensors, fuel flow or fuel cut sensors, and the like.

The vehicle 100 includes a powertrain 120. As stated before, the vehicle 100 may be an HEV or PHEV vehicle and can be operated using the engine 122 and/or one or more electric motor(s) 124 that may act as electric traction motors. However, as explained previously, this is one example in the vehicle 100 could be a traditional vehicle or could be a traditional vehicle having a start-stop system. The engine 122 may be an internal combustion engine, such as a natural gas, gasoline, or diesel engine. A transmission 126 may coordinate power to one or more wheels of the vehicle 100 generated by the engine 122 and/or the electric motor(s) 124. The components of the powertrain 120 may be controlled by the ECUs 105.

Since this example illustrates the use of electric motor(s) 124, the powertrain 120 may also include a battery 128 that can store electricity that can be utilized to power the electric motor(s) 124. The battery 128 may be made up of one or more cells. The battery 128 may be charged using regenerative braking and, if the vehicle 100 is a PHEV, may be additionally charged using electricity from a power grid. As it is well known, HEV and PHEV vehicles can operate in an EV mode based on the amount of charge in the battery 128 and/or power demands from the driver. As the charge in the battery 128 drops, or in situations where the driver places a power demand necessitating the use of the engine 122, the vehicle 100 may start the engine 122. Conversely, when the battery 128 is sufficiently charged or when the power demand drops, the vehicle 100 may shut down the engine 122 and return to operating in an EV mode The components of the vehicle 100 may be connected via one or more buses, such as a controller area network (CAN) bus 115. Of course, it should be understood that any type of methodology for connecting the various components of the vehicle 100 can be implemented.

Figure 4:
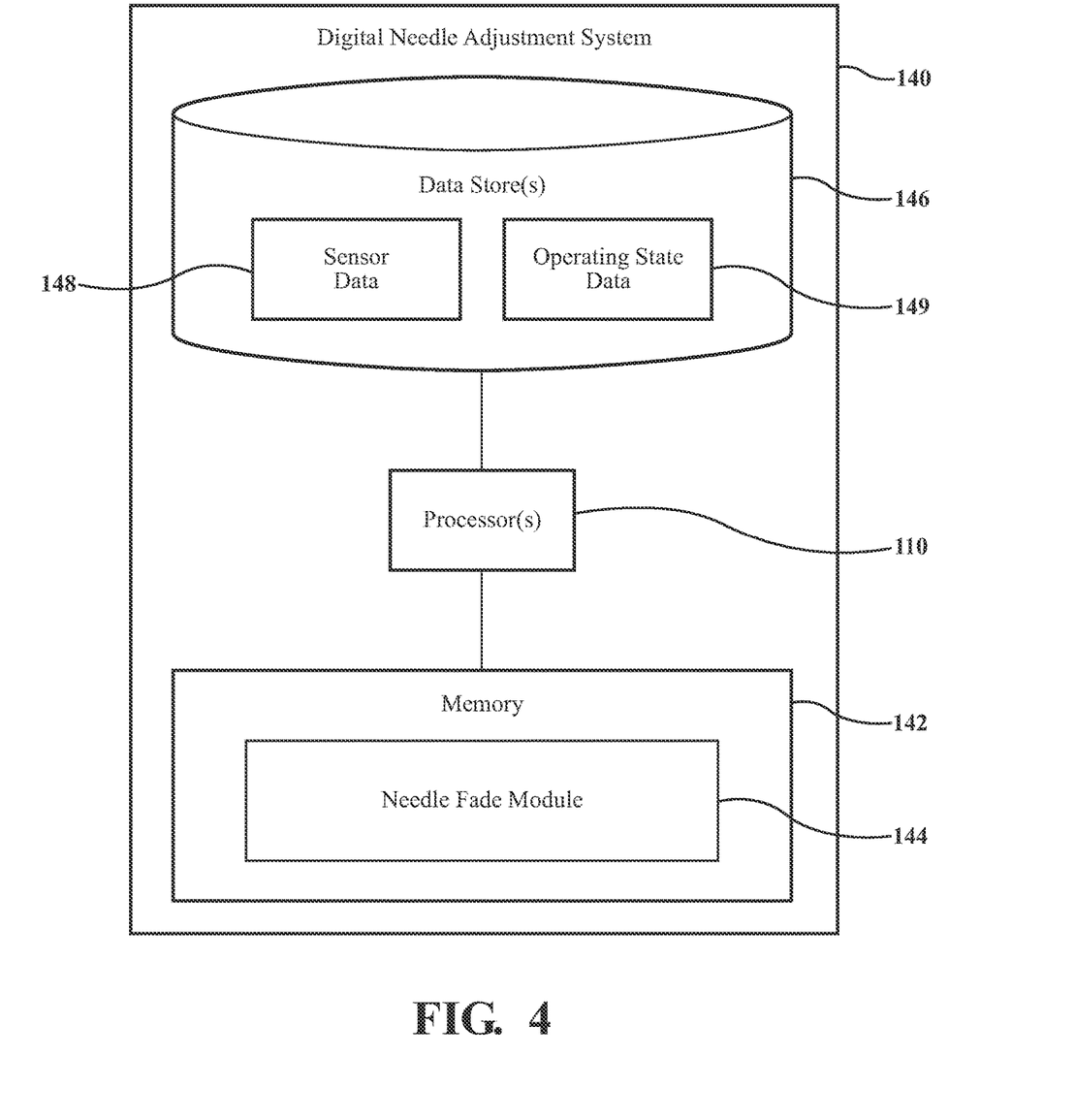
FIG. 4 is a more detailed illustration of the digital needle adjustment system.

With reference to FIG. 4, one embodiment of the digital needle adjustment system 140 is further illustrated. As shown, the digital needle adjustment system 140 includes a processor(s) 110. Accordingly, the processor(s) 110 may be a part of the digital needle adjustment system 140 or the digital needle adjustment system 140 may access the processor(s) 110 through a data bus or another communication path. In one or more embodiments, the processor(s) 110 is an application-specific integrated circuit that is configured to implement functions associated with a needle fade module 144. In general, the processor(s) 110 is an electronic processor such as a microprocessor that is capable of performing various functions as described herein.

In one embodiment, the digital needle adjustment system 140 includes a memory 142 that stores the needle fade module 144. The memory 142 may be a random-access memory (RAM), read-only memory (ROM), a hard disk drive, a flash memory, or other suitable memory for storing the needle fade module 144. The needle fade module 144 is, for example, computer-readable instructions that, when executed by the processor(s) 110, cause the processor(s) 110 to perform the various functions disclosed herein.

Furthermore, in one embodiment, the needle fade module 144 includes one or more data store(s) 146. The data store(s) 146 is, in one embodiment, an electronic data structure such as a database that is stored in the memory 142 or another memory and that is configured with routines that can be executed by the processor(s) 110 for analyzing stored data, providing stored data, organizing stored data, and so on. Thus, in one embodiment, the data store(s) 146 stores data used by the needle fade module 144 in executing various functions.

For example, the data store(s) 146 can include sensor data 148 and/or operating state data 149. The sensor data 148 may be collected by one or more of the powertrain sensor(s) 130. The operating state data 149 may be data indicating the operating state of the engine 122 of the vehicle 100. The operating state data 149 can include information on whether the engine 122 is in a running state, an off state, a shutdown state, and/or a start state. In one example, the running state of the engine 122 is when the engine is operating. The running state of the engine 122 may also include a determination of how long the engine has been operating and/or if the engine speed of the engine 122 is above a threshold. For example, the running state may occur when the engine 122 is running for a certain period of time, for example, more than five seconds, and/or above an engine speed threshold.

The off state of the engine 122 includes situations when the engine speed of the engine 122 is approximately zero. This may occur when the vehicle 100 is turned off and/or in situations when the vehicle 100 utilizes the electric motor(s) to provide propulsion to the vehicle 100 in lieu of utilizing the engine 122. This may occur when the vehicle 100 is operating in an EV mode.

The start state of the engine 122 includes situations when the engine 122 is transitioning between the off state and the running state. The shutdown state of the engine 122 includes situations when the engine 122 is transitioning between the running state and the off state.

The needle fade module 144 includes instructions that cause the processor(s) 110 to adjust the transparency of the digital needle 40 based on the operating state of the engine 122. In one example, the needle fade module 144 causes the processor(s) 110 to calculate a control signal that controls the level of visibility of the digital needle 40. In this example, the processor(s) 110 may be a processor that forms part of an electronic fuel injection ECU but could be another processor from another type of ECU. The control signal determined by the processor(s) 110 may then be provided to the CAN bus 115, where it is received by a display ECU 135. The display ECU 135 can then control the transparency of the digital needle 40 based on the received control signal.

The control signal may be represented in terms of the percentage of graphical transparency of the digital needle 40. In one example, the percentage may vary between 0 and 1, wherein 0 and 1 are the minimum and maximum levels of transparency, respectively. Typically, the control signal defaults to 0 (full needle visibility) unless conditions are met to transition to another transparency level. With regards to the meaning of transparency, transparency of the digital needle 40 means that as the digital needle 40 becomes more transparent, background images become more visible. For example, as the digital needle 40 becomes more transparent, image information relating to the hash lines 36 and numbers 38 or other digital information displayed on the digital gauge 34 become more visible in portions where the digital needle 40 is present. Different examples of different levels of transparency of the digital needle 40 will be described later in this specification and are shown at least in FIGS. 6A-6E. By making the digital needle 40 more transparent or less intense, the driver operating the vehicle will be less distracted by the digital needle 40 in instances where the digital needle 40 ounces that typically occur when the engine 122 is in a shutdown state and/or start state.

Figure 5:
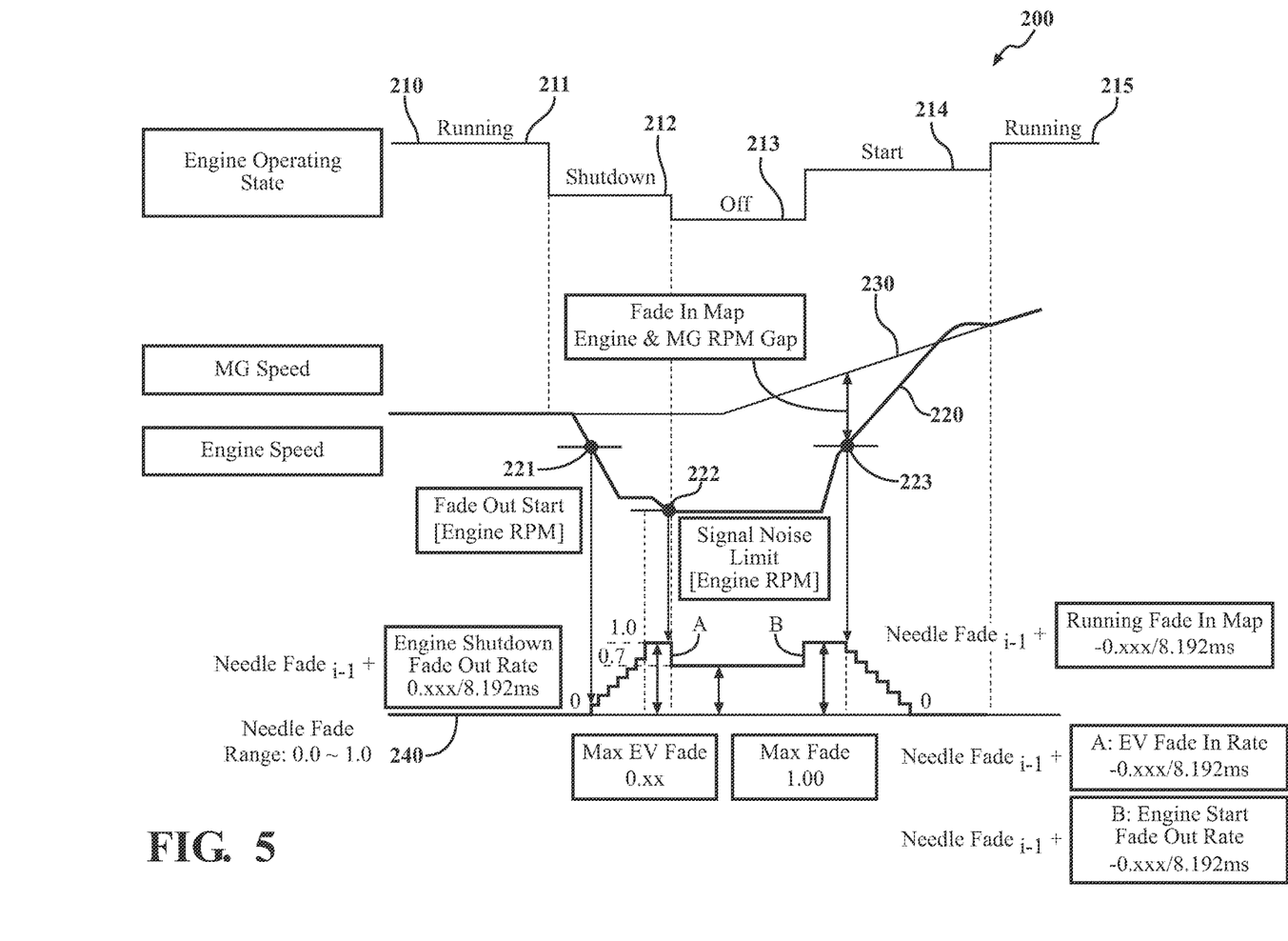
FIG. 5 illustrates a control diagram that describes when the transparency of the digital needle is adjusted.

To better understand how the control signal is generated, reference is made to FIG. 5, which illustrates the control diagram 200 for generating a control signal 240. The control diagram 200 may be expressed as a series of instructions stored within the needle fade module 144 that are executed by the processor(s) 110 to cause the processor(s) 110 to generate the control signal 240.

Here, the control diagram 200 illustrates one example of adjusting the control signal 240 output by the processor(s) 110 and received by the display ECU 135 of the display device 30. Here, illustrated are representations, over a time period, of the engine operating state 210 of the engine 122, an engine speed 220 of the engine 122, a motor-generator speed 230 of the electric motor(s) 124, and the control signal 240 that is provided to the display ECU 135 that causes the transparency of the digital needle 40 to change.

The engine operating state 210 is shown over the time period to be in a running state 211, followed by a shutdown state 212, followed by an off state 213, followed by a start state 214, and followed by a running state 215. It should be understood that the operating states 211-215 are just one example of a scenario of different operating states of the engine 122 over time.

Also illustrated is an engine speed 220 and the motor-generator speed 230 as they vary between the different engine operating states 211-215. As can be seen in this example, the engine speed 220 is elevated when the engine is in the running states 211 and 215, declines when in the shutdown state 212, is at zero when in the off state 213, and then rises again when in the start state 214.

Figure 6A:
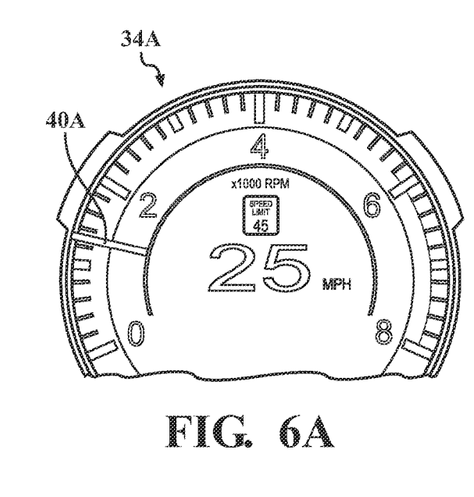
FIGS. 6A-6E illustrate digital gauges displaying a digital needle at different transparency levels based on the control diagram of FIG. 5.

The control signal 240 that controls the transparency of the digital needle 40 is shown to vary during the different engine operating states 211-215 of the engine 122. When the engine 122 is in the running state 211 or 215, the needle fade module 144 causes the processor(s) 110 to set the control signal 240 to zero, indicating minimum transparency and thus maximum visibility. As such, digital needle 40 is readily visible to the driver. FIG. 6A illustrates example representations of the digital gauge 34A and the digital needle 40A. The digital gauge 34A shows the digital needle 40A as completely opaque and readily visible to the driver, which occurs when the engine 122 is in the running state 211 or 215.

Figure 6B:
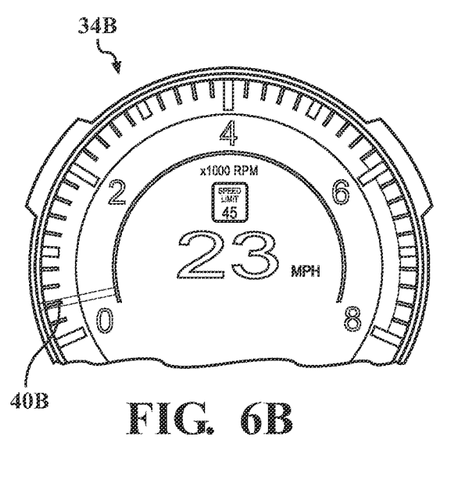

The needle fade module 144 causes the processor(s) 110 to begin changing the control signal 240 to increase the needle fade when the engine 122 is in a shutdown state 212. In one example, when in the shutdown state 212, the increase in the needle fade may occur when the engine 122 has been determined to be turned off, the engine speed of the engine 122 falls below a threshold, represented by threshold 221, and/or when it is determined that fuel has been cut to the engine 122. Information regarding if the engine 122 is turned off, the engine speed of the engine 122, and if fuel has been cut to the engine 122 can be provided by one or more powertrain sensor(s) 130 or by the powertrain 120. During this transition, the transparency of the digital needle 40 may be gradually stepped up in increments based on one or more cycles of the processor(s) 110. In one example, the cycles may be approximately 8.192 ms. An example of the digital needle and the digital gauge in the shutdown state is shown in FIG. 6B as digital needle 40B and digital gauge 34B.

Figure 6C:
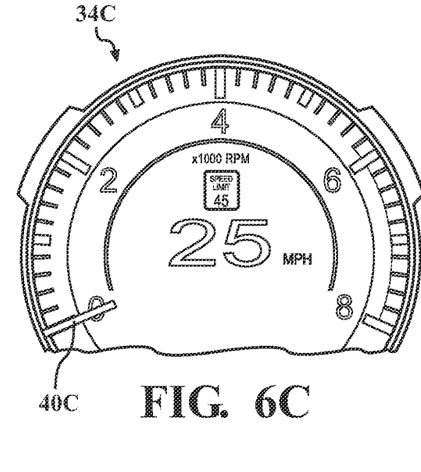

In the shutdown state 212, the needle fade module 144 causes the processor(s) 110 to gradually fade to the digital needle 40 until reaching the off state 213, where the digital needle 40 may be completely transparent and invisible to the driver. The needle fade module 144 may cause the processor(s) 110 to determine that the engine 122 is in the off state when the engine speed 220 drops below a signal noise limit 222. Once reaching the off state, the needle fade module 144 may cause the processor(s) 110 to reduce the fading of the digital needle 40, so that it is still transparent but not distracting to the driver. In this example, the digital needle 40 may be faded by 70%, referred to as a middle transparency. An example of the digital needle and the digital gauge in the off state is shown in FIG. 6C as digital needle 40C and digital gauge 34C.

Figure 6D:
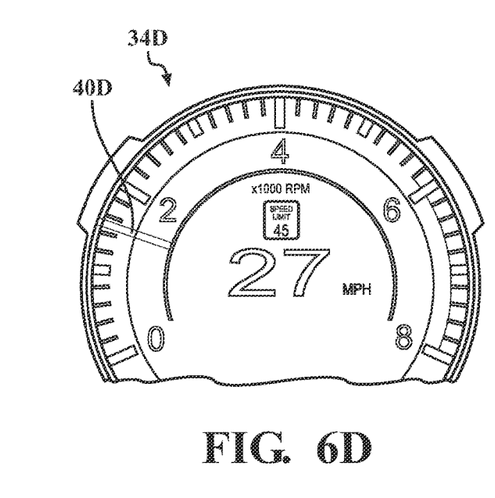

When the engine 122 enters the start state 214, the needle fade module 144 may cause the processor(s) 110 to gradually increase the fading of the digital needle 40, so that it is completely transparent again and invisible to the driver. Upon reaching an engine speed threshold 223 when in the start state, the needle fade module 144 may cause the processor(s) 110 to decrease the needle fade, making the digital needle 40 more visible to the driver. An example of the digital needle and the digital gauge in the start state is shown in FIG. 6D as digital needle 40D and digital gauge 34D. The transparency of the digital needle 40 may be gradually stepped down in increments based on one or more cycles of the processor(s) 110. Like before, the cycles may be approximately 8.192 ms.

Figure 6E:
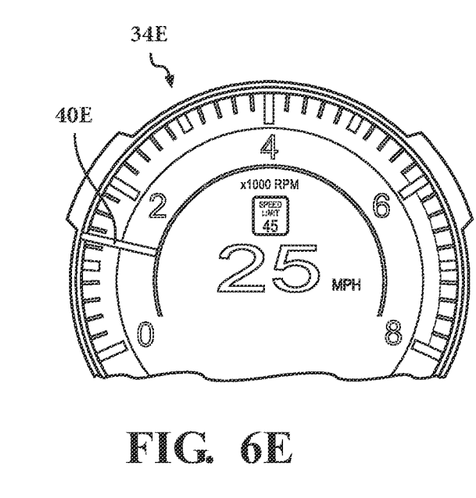

Eventually, the needle fade of the control signal 240 is zero indicating that the digital needle 40 is opaque and readily visible to the driver. The needle fade of the control signal 240 remains zero as the engine operating state remains in the running state 215. An example of the digital needle and the digital gauge in the running state is shown in FIG. 6E as digital needle 40E and digital gauge 34E.

In the control diagram 200 provided in FIG. 5, the control signal 240 is adjusted by the processor(s) 110 based on the operating state and possibly other inputs in a predefined manner. However, in another example, the control signal 240 may be adjusted to vary the transparency of the digital needle 40 by learning the preferences of a particular driver. The preferences of a particular driver may be learned by having the driver provide preferences regarding how they would like the transparency of the digital needle 40 to vary. This may be provided by the driver using an input device 150 and may be stored within the data store(s) 146 to be utilized by the needle fade module 144.

However, in another example, the preferences of a particular driver may be learned by training one or more machine learning models. Any type of machine learning or artificial intelligence type system can be utilized to learn the driver's behavior. In particular, referring back to FIG. 3, a vehicle 100 may also include an input device 150 that can receive inputs from the driver. These inputs may be in the form of camera images captured of the driver that can be utilized to determine when a driver is distracted by the digital needle. Based on inputs received from the input device 150, a model can learn when the driver is distracted and adjust the transparency of the digital needle 40 to minimize the distraction of the driver. In effect, the system can track the driver's gaze to determine a pattern where the driver glances during certain powertrain events. Based on this information, the system can adjust how and when the digital needle 40 fades and under what circumstances.

Figure 7:
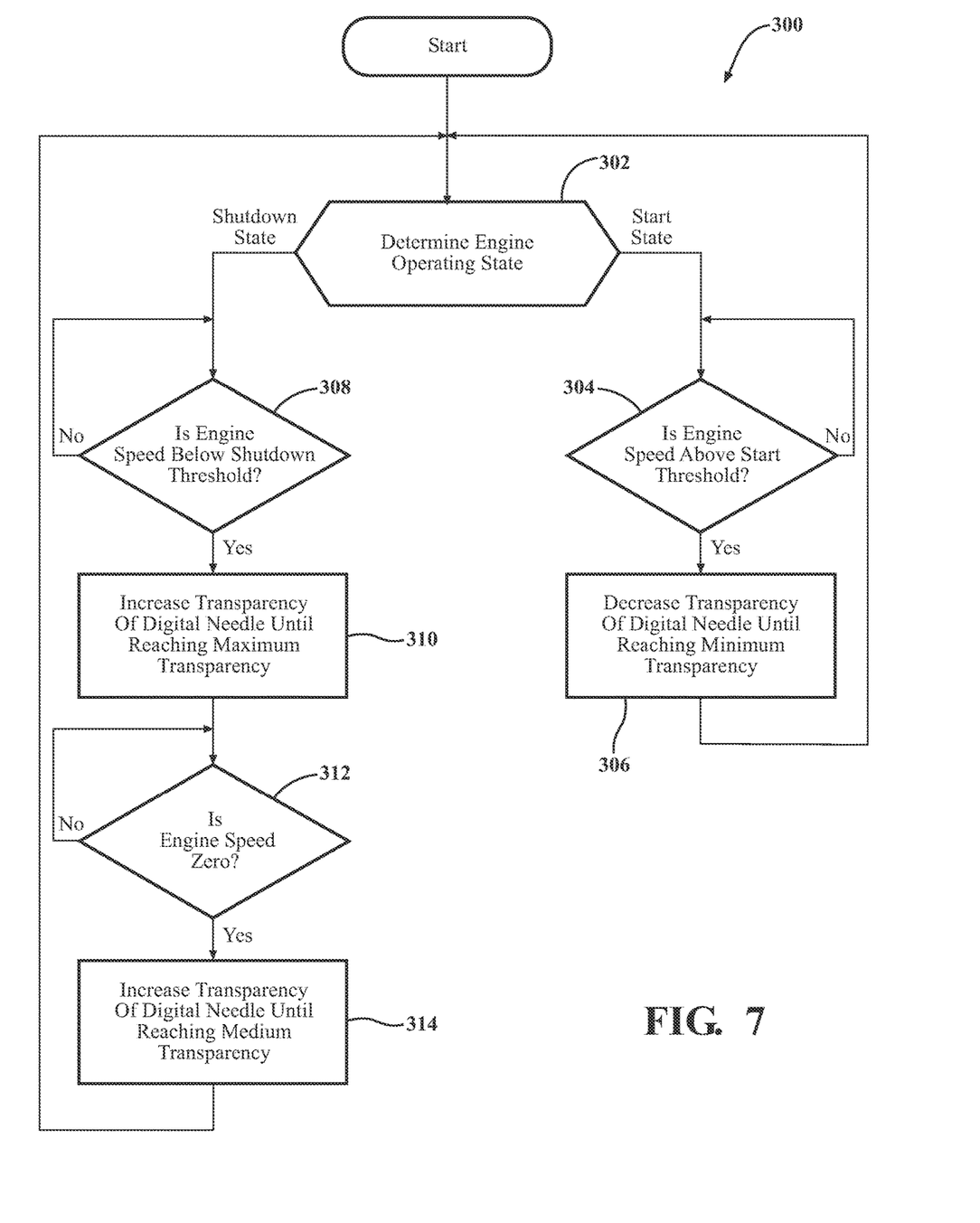
FIG. 7 illustrates a method for adjusting the transparency of a digital needle.

Referring to FIG. 7, a method 300 for adjusting the transparency of a digital needle of a digital gauge is shown. The method 300 will be described from the viewpoint of the vehicle 100 of FIG. 3 and the digital needle adjustment system 140 of FIG. 4. However, it should be understood that this is just one example of implementing the method 300. While method 300 is discussed in combination with the digital needle adjustment system 140, it should be appreciated that the method 300 is not limited to being implemented within the digital needle adjustment system 140 but is instead one example of a system that may implement the method 300.

The method 300 begins at step 302, wherein the needle fade module 144 causes the processor(s) 110 to determine an engine operating state of the engine 122 of the vehicle 100. The determination regarding the engine operating state of the engine 122 may be determined based on information collected from the powertrain sensor(s) 130. However, the engine operating state may also be provided by one or more ECUs 105 that are able to determine the engine operating state of the engine 122.

As explained before, the engine operating state of the engine 122 of the vehicle 100 may include four states: a running state, an off state, a shutdown state, and a start state. Typically, because the adjustment of the digital needle 40 occurs when in the shutdown state or the off state, the example shown in the method 300 decides regarding which of these two states the engine 122 of the vehicle is in.

If it is determined that the engine operating state of the engine 122 is in the start state, the method proceeds to step 304, wherein the needle fade module 144 causes the processor(s) 110 to determine if the engine speed of the engine 122 is above a start threshold. For example, referring to FIG. 5, the threshold may be similar to the threshold 223. If the engine speed 122 has not yet reached the start threshold, the method 300 essentially waits until this condition is satisfied.

In step 306, once the engine speed is above the start threshold, the needle fade module 144 causes the processor(s) 110 to decrease the transparency of the digital needle 40 until reaching a minimum transparency. To achieve this, the needle fade module 144 may cause the processor(s) 110 to decrease the needle fade, making the digital needle 40 more visible to the driver. An example of the digital needle and the digital gauge in the start state is shown in FIG. 6D as digital needle 40D and digital gauge 34D. The transparency of the digital needle 40 may be gradually stepped down in increments based on one or more cycles of the processor(s) 110. Like before, the cycles may be approximately 8.192 ms. Once step 306 is completed, the method 300 may begin again and return to step 302. It should be understood that instead of decreasing the transparency of the digital needle 40 until reaching the minimum transparency, the transparency of the digital needle 40 may be decreased to something greater than minimum transparency.

Conversely, if it is determined that the engine operating state of the engine 122 is in a shutdown state, the method 300 proceeds to step 308. In step 308, the needle fade module 144 causes the processor(s) 110 to determine if the engine speed of the engine 122 is below a shutdown threshold. For example, referring to FIG. 5, the threshold may be similar to the threshold 221. If the engine speed 122 has not yet reached the shutdown threshold, the method 300 essentially waits until this condition is satisfied.

In step 310, once the engine speed is below the shutdown threshold, the needle fade module 144 causes the processor(s) 110 to increase the transparency of the digital needle 40 until reaching a maximum transparency. To achieve this, the transparency of the digital needle 40 may be gradually stepped up in increments based on one or more cycles of the processor(s) 110. In one example, the cycles may be approximately 8.192 ms. An example of the digital needle and the digital gauge in the shutdown state is shown in FIG. 6B as digital needle 40B and digital gauge 34B. Of course, it should be understood that instead of increasing the transparency of the digital needle 40 until reaching the maximum transparency, the transparency of the digital needle 40 may be increased to something lower than maximum transparency.

In step 312, the needle fade module 144 causes the processor(s) 110 to determine if the engine speed of the engine 122 is zero or has essentially fallen below a signal noise limit. Essentially, once the engine speed is zero or has fallen below a signal noise limit, the engine 122 is in the off state. In step 314, the needle fade module 144 may cause the processor(s) 110 to decrease the fading of the digital needle 40, so that it is still transparent but not distracting to the driver. In this example, the digital needle 40 may be faded by 70%, referred to as a middle transparency. An example of the digital needle and the digital gauge in the off state is shown in FIG. 6C as digital needle 40C and digital gauge 34C. Once step 314 is complete, the method 300 may begin again and return to step 302.

As such, the system and method described herein can adjust the transparency of a digital needle based on the operating state of the vehicle to reduce the driver's distraction. This is particularly useful in situations where the engine of the vehicle may be switched on or off routinely, such as is the case with HEVs and PHEVs.

It should be appreciated that any of the systems described in this specification can be configured in various arrangements with separate integrated circuits and/or chips. The circuits are connected via connection paths to provide for communicating signals between the separate circuits. Of course, while separate integrated circuits are discussed, the circuits may be integrated into a common integrated circuit board in various embodiments. Additionally, the integrated circuits may be combined into fewer integrated circuits or divided into more integrated circuits.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a graphics processing unit (GPU), a CD, other optical medium, a RAM, a ROM, a memory chip or card, a memory stick, and other media from which a computer, a processor or other electronic device can read. In the context of this document, a computer-readable storage medium may be any tangible medium that can contain or store a program for use by or in connection with an instruction execution system, apparatus, or device.

The following includes definitions of selected terms employed herein. The definitions include various examples and/or forms of components that fall within the scope of a term and may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that, when executed, perform an algorithm, and so on. In one or more embodiments, a module may include one or more CMOS gates, combinations of gates, or other circuit components. Where multiple modules are described, one or more embodiments may include incorporating the multiple modules into one physical module component. Similarly, where a single module is described, one or more embodiments distribute the single module between multiple physical components.

Additionally, module, as used herein, includes routines, programs, objects, components, data structures, and so on that perform tasks or implement data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), as a graphics processing unit (GPU), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
    a processor; and
    a memory in communication with the processor, the memory having a needle fade module including instructions that, when executed by the processor, cause the processor to adjust a transparency of a digital needle based on an operating state of an engine of a vehicle, the operating state is based on an engine speed of the vehicle, wherein the shutdown state occurs when the engine speed is below a shutdown threshold and the start state occurs when the engine speed exceeds a start threshold;
    the operating state includes at least one of a shutdown state and a start state, the shutdown state occurs when the engine transitions from a running state to an off state and the start state occurs when the engine transitions from the off state to the running state; and
    wherein the needle fade module further includes instructions that, when executed by the processor, causes the processor to gradually decrease the transparency of the digital needle when in the start state from a maximum transparency to a minimum transparency as the engine transitions from the off state to the running state.

2. The system of claim 1, wherein the vehicle operates in an electric vehicle mode powered by an electric motor when the engine is in the off state.

3. The system of claim 1, wherein the needle fade module further includes instructions that, when executed by the processor, causes the processor to increase the transparency of the digital needle when in the shutdown state.

4. The system of claim 3, wherein the needle fade module further includes instructions that, when executed by the processor, causes the processor to gradually increase the transparency of the digital needle when in the shutdown state from a minimum transparency to a maximum transparency as the engine transitions from the running state to the off state.

5. The system of claim 4, wherein the needle fade module further includes instructions that, when executed by the processor, causes the processor to decrease the transparency of the digital needle to a middle transparency when the engine is in the off state, the middle transparency being more transparent than the minimum transparency and less transparent than the maximum transparency.

6. The system of claim 1, wherein the transparency of the digital needle is additionally based on a learned behavior of a driver of the vehicle.

7. A method comprising steps of:
    adjusting a transparency of a digital needle based on an operating state of an engine of a vehicle, the engine operating state includes at least one of a shutdown state and a start state, the shutdown state occurs when the engine transitions from a running state to an off state and the start state occurs when the engine transitions from the off state to the running state the operating state is based on an engine speed of the vehicle, the shutdown state occurs when the engine speed is below a shutdown threshold and the start state occurs when the engine speed exceeds a start threshold; and
    gradually decreasing the transparency of the digital needle when in the start state from a maximum transparency to a minimum transparency as the engine transitions from the off state to the running state.

8. The method of claim 7, wherein the vehicle operates in an electric vehicle mode powered by an electric motor when the engine is in the off state.

9. The method of claim 7, further comprising the step of increasing the transparency of the digital needle when in the shutdown state.

10. The method of claim 9, further comprising the steps of gradually increasing the transparency of the digital needle when in the shutdown state from a minimum transparency to a maximum transparency as the engine transitions from the running state to the off state.

11. The method of claim 10, further comprising the step of decreasing the transparency of the digital needle to a middle transparency when the engine is in the off state, the middle transparency being more transparent than the minimum transparency and less transparent than the maximum transparency.

12. The method of claim 7, further comprising the step of decreasing the transparency of the digital needle when in the start state.

13. A non-transitory computer-readable medium including instructions that, when executed by a processor, cause the processor to:
    adjust a transparency of a digital needle based on an operating state of an engine of a vehicle, the engine operating state includes at least one of a shutdown state and a start state, the shutdown state occurs when the engine transitions from a running state to an off state and the start state occurs when the engine transitions from the off state to the running state the operating state is based on an engine speed of the vehicle, the shutdown state occurs when the engine speed is below a shutdown threshold and the start state occurs when the engine speed exceeds a start threshold; and
    gradually decrease the transparency of the digital needle when in the start state from a maximum transparency to a minimum transparency as the engine transitions from the off state to the running state.

14. The non-transitory computer-readable medium of claim 13, further including instructions that, when executed by the processor, cause the processor to:
   gradually increase the transparency of the digital needle when in the shutdown state from a minimum transparency to a maximum transparency as the engine transitions from the running state to the off state; and
   decreasing the transparency of the digital needle to a middle transparency when the engine is in the off state, the middle transparency being more transparent than the minimum transparency and less transparent than the maximum transparency.

* * * * *